United States Patent
Tomita et al.

(10) Patent No.: US 11,446,962 B2
(45) Date of Patent: Sep. 20, 2022

(54) TIRE

(71) Applicant: SUMITOMO RUBBER INDUSTRIES, LTD., Hyogo (JP)

(72) Inventors: Shintaro Tomita, Hyogo (JP); Koichi Nakajima, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 464 days.

(21) Appl. No.: 16/226,758

(22) Filed: Dec. 20, 2018

(65) Prior Publication Data
US 2019/0184759 A1  Jun. 20, 2019

(30) Foreign Application Priority Data
Dec. 20, 2017  (JP) .............................. JP2017-244326

(51) Int. Cl.
*B60C 11/12* (2006.01)
*B60C 11/03* (2006.01)

(52) U.S. Cl.
CPC .......... *B60C 11/12* (2013.01); *B60C 11/0302* (2013.01); *B60C 11/0309* (2013.01); *B60C 11/0311* (2013.01); *B60C 11/0323* (2013.01); *B60C 11/1236* (2013.01); *B60C 11/1281* (2013.01); *B60C 2011/036* (2013.01); *B60C 2011/0341* (2013.01); *B60C 2011/0353* (2013.01); *B60C 2011/1209* (2013.01); *B60C 2011/1231* (2013.01); *B60C 2011/1254* (2013.01)

(58) Field of Classification Search
CPC ......... B60C 2011/1209; B60C 11/0323; B60C 2011/0033; B60C 2011/0358; B60C 11/12
See application file for complete search history.

(56) References Cited

U.S. PATENT DOCUMENTS

| 2008/0053585 A1* | 3/2008 | Ohara | B60C 11/0306 152/209.25 |
| 2011/0168311 A1* | 7/2011 | Voss | B60C 11/1218 152/209.18 |
| 2011/0220258 A1* | 9/2011 | Taniguchi | B60C 11/1281 152/209.18 |

(Continued)

FOREIGN PATENT DOCUMENTS

| DE | 102013111197 A1 | 4/2015 |
| EP | 2311655 A1 | 4/2011 |

(Continued)

OTHER PUBLICATIONS

European Search Report, European Patent Office, Application No. 18205561.6, dated Apr. 15, 2019.

*Primary Examiner* — Timothy Kennedy
*Assistant Examiner* — Farah Taufiq
(74) *Attorney, Agent, or Firm* — Greenblum & Bernstein, P.L.C.

(57) ABSTRACT

A tire comprises a tread portion provided with at least one main groove extending continuously in the tire circumferential direction to axially divide the tread portion into land portions. The land portion is provided with axial grooves extending thereacross in the tire axial direction, and each comprising a radially outer portion and a radially inner portion which is wider than the radially outer portion. The radially outer portion of each of the axial grooves is crossed by one ore more sipes.

18 Claims, 5 Drawing Sheets

(56) References Cited

U.S. PATENT DOCUMENTS

| | | | | |
|---|---|---|---|---|
| 2012/0222788 | A1* | 9/2012 | Nishiwaki | B60C 11/12 |
| | | | | 152/209.18 |
| 2015/0246585 | A1* | 9/2015 | Yasunaga | B60C 11/1307 |
| | | | | 152/209.21 |
| 2016/0016435 | A1* | 1/2016 | Volk | B60C 11/0327 |
| | | | | 152/209.5 |
| 2018/0244111 | A1* | 8/2018 | Zhu | B60C 11/0306 |
| 2018/0345736 | A1* | 12/2018 | Cambon | B60C 11/1281 |
| 2020/0298625 | A1* | 9/2020 | Zhu | B60C 11/1218 |

FOREIGN PATENT DOCUMENTS

| | | | | |
|---|---|---|---|---|
| EP | 2644408 | A1 | 10/2013 | |
| EP | 2834089 | A1 | 2/2015 | |
| JP | 2001063323 | A * | 3/2001 | B60C 11/1281 |
| JP | 2003159910 | A | 6/2003 | |
| JP | 2006051863 | A | 2/2006 | |
| JP | 5179668 | | 1/2013 | |
| WO | WO-2015051932 | A1 * | 4/2015 | B60C 11/032 |
| WO | 2017103437 | A1 | 6/2017 | |

* cited by examiner

TIRE

TECHNICAL FIELD

The present invention relates to a tire provided with an axial groove whose radially inner portion is widened, more particularly to a combination of an axial groove and a sipe capable of improving the demolding.

BACKGROUND ART

There has been known a tire provided in the tread portion with a groove comprising a radially outer narrow width portion and a radially inner wider width portion. Such a groove is formed, during vulcanization molding the tire, by the use of a rib protruding from the inner surface of the vulcanization mold. The rib is therefore, composed of a narrow width part protruding from the inner surface for forming the radially outer narrow width portion of the groove, and a wider part at the protruding end of the narrow width part for forming the radially inner wider width portion of the groove. Accordingly, when the vulcanized tire is demolded, the wider part of the rib has to be pulled out of the molded groove, passing through the narrow width portion, and there is a tendency that damages such as chipping and cracking of the tread rubber occur. Thus, there is a problem with demolding.

PRIOR ART DOCUMENT

Patent Document: Japanese Patent No. 5179668

SUMMARY OF THE INVENTION

Problems to be Solved by the Invention

It is therefore, an object of the present invention to provide a tire provided with axial grooves whose radially inner portion is widened, in which the tire can be demolded easily without causing damages such as chipping and cracking of the tread rubber.

According to the present invention, a tire comprise:
a tread portion provided with at least one main groove extending continuously in the tire circumferential direction to axially divide the tread portion into ground contacting land portions, wherein
at least one of the land portions is provided with axial grooves extending in a tire axial direction and each comprising a radially outer portion and a radially inner portion which is wider than the radially outer portion, and
at least the radially outer portion of each of the axial grooves is crossed by a sipe.

Further, the tire according to the present invention may have the following features (1)-(10):
(1) the above-said sipe extends radially inwardly and terminates without reaching the radially inner portion;
(2) the above-said sipe extends radially inwardly to the radially inner portion;
(3) the above-said sipe crosses the axial groove at substantially a right angle;
(4) the length of the above-said sipe is larger than the maximum width of the radially inner portion;
(5) the axial grooves are inclined with respect to the tire axial direction;
(6) the axial grooves are inclined at 25 to 70 degrees with respect to the tire axial direction;
(7) each of the axial grooves is curved in an arc shape in its top view;
(8) each of the axial grooves is crossed by a plurality of the sipes;
(9) the land portions include a pair of axially outermost shoulder land portions and a pair of middle land portions between the shoulder land portions, and
the above-said at least one of the land portions provided with the axial grooves and the sipes is the middle land portions;
(10) the above-said at least one of the land portions provided with the axial grooves and the sipes is made of a rubber compound having a complex elastic modulus greater than that of other land portion not provided with the axial grooves and the sipes.

Definitions

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

The tread edges Te are the axial outermost edges of the ground contacting patch of the tire which occurs under a normally inflated loaded condition when the camber angle of the tire is zero.

The normally inflated loaded condition is such that the tire is mounted on the standard wheel rim and inflated to the standard pressure and loaded with the standard tire load.

The tread width TW is the width measured under the normally inflated unloaded condition, as the axial distance between the tread edges Te determined as above.

In this application including specification and claims, the term "groove" means a groove which, at least part thereof in the depth direction, has a width of 1.5 mm or more, and the term "sipe" means a sipe which has a width less than 1.5 mm over the entire depth.

The values of the complex elastic modulus E* referred in the description are those measured according to Japanese Industrial standard (JIS) K6394 under the following conditions by the use of a viscoelastic spectrometer manufactured by Iwamoto Seisakusyo KK.
initial strain: 10%
amplitude: +/−2%
frequency: 10 Hz
deformation mode: tensile
temperature: 70 deg. C

DESCRIPTION OF THE PREFERRED EMBODIMENTS

Embodiments of the present invention will now be described with reference to the accompanying drawings.

The present invention can be applied to various tires for passenger cars, heavy duty vehicles, motorcycles and the like.

In the following embodiment, the tire according to the present invention is a pneumatic tire for passenger cars.

As well known in the art, a pneumatic tire comprises a tread portion 2 whose radially outer surface defines the tread, a pair of axially spaced bead portions mounted on rim seats, a pair of sidewall portions extending between the tread edges and the bead portions, a carcass extending between the bead portions through the tread portion and the sidewall portions, and a tread reinforcing belt disposed radially outside the carcass in the tread portion.

The tread portion 2 is provided with at least one main groove 3 extending continuously in the tire circumferential direction.

In this embodiment, a plurality of the main grooves 3, for example, 2 to 6 main grooves 3 are provided.

Figure 1:
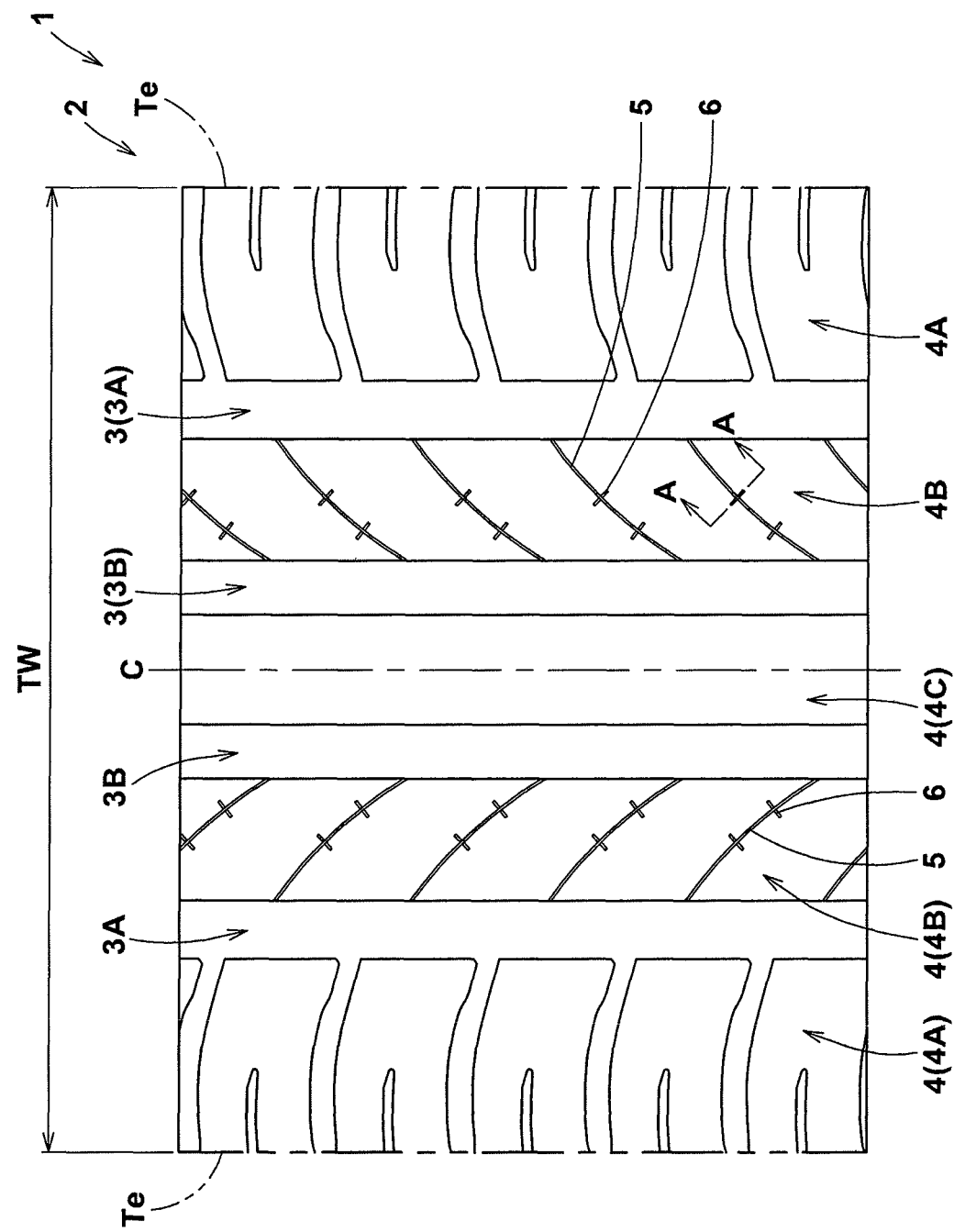
FIG. 1 is a developed partial view of the tread portion of a tire as an embodiment of the present invention.

In the example shown in FIG. 1, the main grooves 3 are a pair of shoulder main grooves 3A disposed closest to the tread edges Te, and a pair of crown main grooves 3B disposed between the shoulder main grooves 3A.

The main groove 3 may be a straight groove, a zigzag groove or a wavy groove. In this example, the shoulder main grooves 3A and the crown main grooves 3B are straight grooves.

By the main groove(s) 3, the tread portion 2 is axially divided into a plurality of land portions 4. In this example, the land portions 4 are: a pair of shoulder land portions 4A between the shoulder main grooves 3A and the tread edges Te; a pair of middle land portions 4B between the shoulder main grooves 3A and the crown main groove 3B; and a crown land portion 4C between the crown main grooves 3B.

At least one of the land portions 4 is provided with axial grooves 5 each extending across the entire axial width of the land portion 4 and each crossed by one or more sipes 6. In this embodiment, each of the middle land portions 4B is provided with the axial grooves 5 and the sipes 6.

Figure 2:
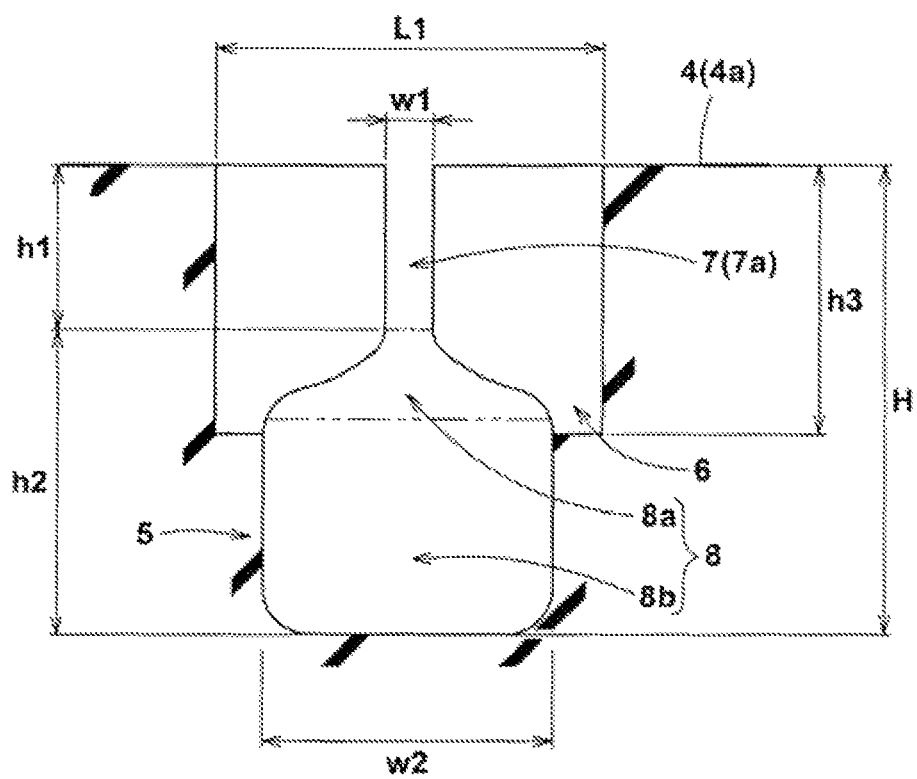
FIG. 2 is a cross-sectional view taken along line A-A in FIG. 1.

FIG. 2 is a cross-sectional view of the axial groove 5 taken along line A-A in FIG. 1.

As shown, the axial groove 5 comprises: a radially outer portion 7 opened in the tread surface 4a of the land portion 4 and having a smaller width w1; and a radially inner portion 8 having a greater width w2 than the radially outer portion 7. In this example, the cross sectional shape of the axial groove 5 is flask-shaped.

In this example, the sipe 6 is formed to cross at least the entire depth of the radially outer portion 7 as shown in FIG. 2.

Such axial groove 5 and sipes 6 are formed through a vulcanization process for the tire in a mold 20 whose inner surface is provided with protrusions forming the axial groove 5 and sipes 6.

Figure 3:
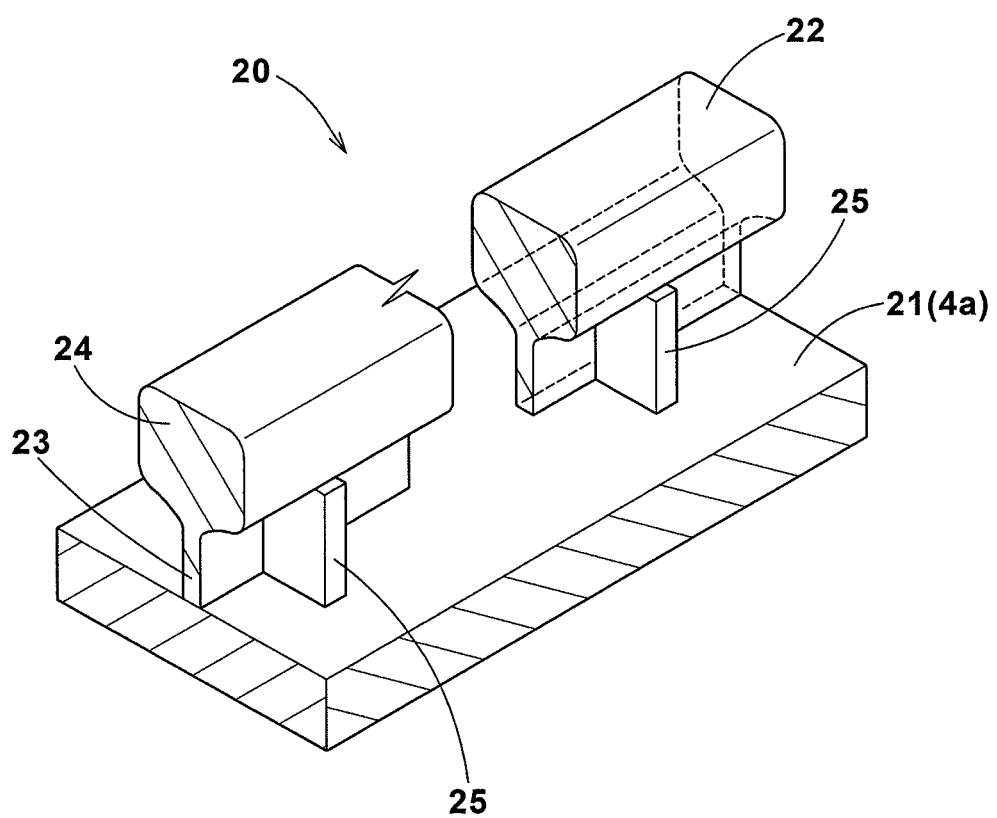
FIG. 3 is an enlarger perspective view of a rib part of a vulcanization mold for forming an axial groove and sipes.

FIG. 3 is an enlarged partial perspective view of such protrusions of the vulcanization mold 20.

As shown, the mold 20 has the inner surface 21 for shaping the tread surface 4a of the land portion 4 and the protrusions including a rib 22 for forming the axial groove 5 and the sipes 6.

In this example, the rib 22 is made up of a narrow part 23 for forming the radially outer portion 7, a wide part 24 for forming the radially inner portion 8, and parts 25 for forming the sipes 6. The narrow part 23 protrudes from the inner surface 21. The wide part 24 is connected to the inner end of the narrow part 23. The parts 25 protrude from the inner surface 21.

In order to demold the vulcanized tire 1 from the mold 20, the rib 22 has to be pulled out of the land portion 4. At that time, by the motion of the wide part 24 of the rib 22, the rubber of the land portion 4 can be largely deformed owing to the sipes 6 which are opened and become wider.

As a result, the radially outer narrow portion 7 of the axial groove 5 can be opened largely, and the wide part 24 of the rib 22 can easily pass through the radially outer portion 7, therefore, damages such as tread rubber chipping and cracking can be suppressed.

Preferably, the groove width w1 of the radially outer portion 7 is set in a range from 0.6 to 1.2 mm in order that the radially outer portion 7 helps to increase the rigidity of the land portion 4 when the tire is new or in the initial stage of the tread wear life as compared with the case where the radially outer portion 7 is as wide as the radially inner portion 8, and thereby helps to suppress the steering stability from being deteriorated.

Preferably, the maximum of the width w2 of the radially inner portion 8 is set in a range from 3 to 7 mm in order that the axial groove 5 can exert high drainage performance when the wear of the tread portion progresses to the radially inner portion 8 in the middle to final stage of the tread wear life.

It is preferable that the maximum groove width w2 of the radially inner portion 8 is set to be not less than 3.8 times but not more than 6.7 times the width w1 of the radially outer portion 7. If less than 3.8 times, the effect to maintain the drainage performance in the late stage of the tread wear life may be decreased. If more than 6.7 times, there is a possibility that tread rubber chipping or cracking occurs when the wide part 24 of the rib 22 passes through the radially outer portion 7 to demold the tire.

In order to improve the demolding and the drainage performance in a well-balanced manner, it is preferred that the depth h2 of the radially inner portion 8 is set in a range from 70% to 120% of the maximum groove width w2. (0.70=<h2/w2=<1.20)

Figure 4:
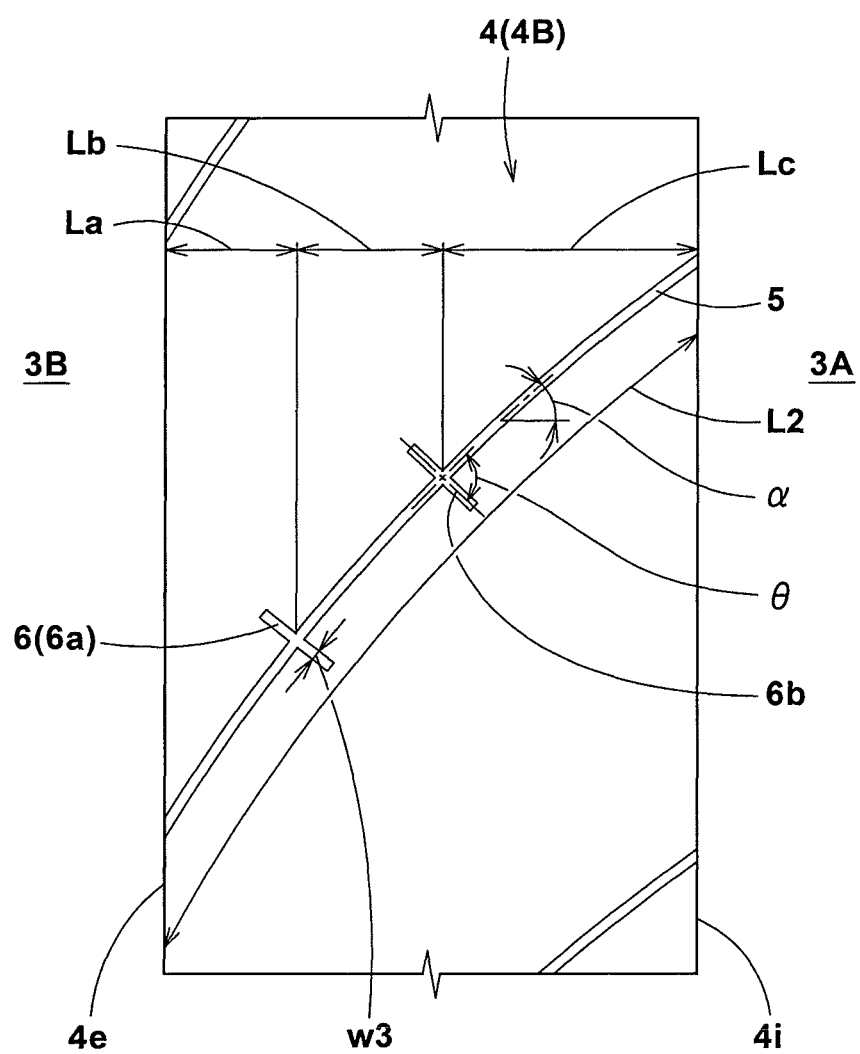
FIG. 4 is a closeup of a part of FIG. 1.

In this embodiment, as shown in FIG. 4, the axial grooves 5 extend across the entire axial width of the land portion 4, and both ends of each axial groove 5 are opened on both sides of the land portion 4. This facilitates the widening of the radially outer portion 7 when the tire is demolded for effectively suppressing the damages such as chipping and cracking of the rubber of the land portion.

In another example, however, the axial groove 5 may have such a configuration in which one end terminates in the land portion 4 and the other end communicates with the main groove 3. Further, in still another example, both ends of the axial groove 5 may terminate in the land portion 4.

The axial groove 5 is preferably inclined with respect to the tire axial direction in order that water film existing between the tread surface 4a of the land portion 4 and the road surfaces can be smoothly guided to the outside of the land portion 4 and removed by the component in the tire circumferential direction of the edges of the axial groove 5. In order to effectively derive such effect, it is preferred that the axial groove 5 is inclined at an angle α of from 25 to 70 degrees with respect to the tire axial direction. If less than 25 degrees, the water film may not be effectively guided and removed. If more than 70 degrees, there is a possibility that the rigidity in the tire axial direction of the land portion 4 becomes insufficient.

It is preferable that the angle α of the axial groove 5 with respect to the tire axial direction is gradually decreased from the axially inside to the axially outside of the tire in order that the rigidity in the tire axial direction of an axially outer part of the land portion 4 is kept high to thereby improve the steering stability without deteriorating the drainage performance.

The axial groove 5 is accordingly curved in its top view. Thus, the length (and groove volume) of the axial groove 5 is increased, and the drainage effect is enhanced. Further, when the groove walls of the radially outer portion 7 are in contact with each other under load, shearing deformation of the land portion 4 is suppressed, and the apparent rigidity may be increased.

In this example, all the axial grooves 5 have a circular arc shape convexed toward one side in the tire circumferential direction.

As explained above, the radially outer portion 7 is a portion having a width w1 of less than 1.5 mm, and the radially inner portion 8 is a portion having a width w2 of not less than 1.5 mm.

In the example shown in FIG. 2, the radially outer portion 7 includes an equi-width part 7a having the width w1 which is constant in the tire radial direction so as to increase the apparent rigidity of the land portion to improve the steering stability as explained above.

The depth h1 of the radially outer portion 7 is preferably not less than 0.30 times, more preferably not less than 0.40 times, but not more than 0.56 times the groove depth H of the axial groove 5. If less than 0.30 times, there is a possibility that the rigidity of the land portion 4 is decreased. If more than 0.56 times, the effect to improve the drainage performance may be reduced.

In the example shown in FIG. 2, the radially inner portion 8 comprises: a widening part 8a extending radially inwardly from the radially outer portion 7 while gradually increasing the groove width w2; and a constant-width part 8b extending radially inwardly from the widening part 8a, while keeping the groove width w2 constant having the maximum value. As a result, the radially inner portion 8 has a cross sectional shape like a bottle with a pinched mouth such as a flask. However, the radially inner portion 8 may have various cross sectional shapes, for example, a triangular shape in which the width w2 gradually decreased toward the radially outside, a circular shape, a barrel shape, an hourglass shape in which the width w2 gradually increases toward the radially outside and the radially inside and the like.

For example, the groove depth H of the axial groove 5 is about 6.0 to 6.6 mm.

The sipes 6 cross the radially inner portion 8.

In this example, the sipes 6 extend radially inwardly from the tread surface 4a of the land portion 4 to the constant-width part 8b beyond the widening part 8a as shown in FIG. 2 in order that the sipes 6 can further widen the radially outer portion 7 when demolding, and thereby the occurrence of the tread rubber chipping or the like can be more surely suppressed.

In the cross section perpendicular to the longitudinal direction of the axial groove 5, the length L1 of each sipe 6 is preferably set to be larger than the maximum groove width w2 of the radially inner portion 8 in order to further suppress the occurrence of damages such as chipping and cracking. when the length L1 of the sipe 6 becomes excessively large, the rigidity of the land portion 4 may decrease, therefore, the length L1 is more than 1.0 times, and preferably not more than 1.5 times the maximum groove width w2 of the radially inner portion 8. Here, the length L1 of each sipe 6 includes the groove width w1 of the radially outer portion 7.

The depth h3 of the sipes 6 is preferably set in a range from 100% to 200%, more preferably 120% to 170% of the depth h1 of the radially outer portion 7 in view of the effect to suppress the occurrence of rubber chipping or the like.

Preferably, the width w3 of the sipe 6 as shown in FIG. 4 is set in a range from 0.6 to 0.8 mm. If more than 0.8 mm, the rigidity of the land portion 4 may be decreased. If less than 0.6 mm, there is a possibility that the radially outer portion 7 can not be widened sufficiently when demolding.

Each sipe 6 crosses the axial groove 5 at a right angle so that the radially outer portion 7 is well widened when demolding. However, it is also possible that the sipe 6 crosses the axial groove 5 at an intersecting angle θ of less than 90 degrees, but preferably not less than 70 degrees.

It is preferable that two or more sipes 6 are provided per each axial groove 5 so that the radially outer portion 7 is easily widened when demolding whereas it is also possible to provide one sipe 6 per axial groove 5. In this example, two sipes 6 are provided per each axial groove 5.

In this example, each sipe 6 extends linearly in its top view. However, the sipe 6 may be curved in an arcuate shape, for example.

The two sipes 6 in this example are an axially inside sipe 6a and an axially outside sipe 6b. The two sipes 6a and 6b as a whole are sifted toward the tire equator C.

More specifically, the axial distance La between the axially inside sipe 6a and the axially inner edge 4e of the land portion 4 is smaller than the axial distance Lc between the axially outside sipe 6b and the axially outer edge 4i of the land portion 4. Further, in this example, the axial distance Lb between the sipes 6a and sipes 6b is greater than the axial distance La and smaller than the axial distance Lc.

when the vulcanized tire 1 is demolded from the mold 20, there is a tendency that the pullout of the ribs 22 of the vulcanization mold 20 becomes harder on the axially inside than the axially outside of the tire, therefore, by sifting the sipes 6 toward the tire equator C, the rubber chipping and cracking damages can be effectively suppressed.

However, the arrangement of the plurality of sipes 6 of each axial groove 5 is not limited to the above described example. For example, the plurality of sipes 6 may be arranged at positions which divide the axial groove 5 equally in its longitudinal direction.

Such combination of the axial grooves 5 and the sipes 6 can be formed in the shoulder land portions 4A and/or the crown land portion 4C. From the viewpoint of enhancing the drainage performance of the tire, it is preferable, as shown in FIG. 1, to form the axial grooves 5 and the sipes 6 at least in the middle land portions 4B where water film between the tread surface 4a and the road surface is less likely to be discharged to the outside of the tire 1, as compared with the shoulder land portions.

In the embodiment shown in FIG. 1, the crown land portion 4C is a straight rib provided with neither grooves nor sipes. Each of the shoulder land portions 4A is provided with shoulder lateral grooves extending axially outwardly from the adjacent main groove 3A to the tread edges Te to divide the shoulder land portion 4A into blocks in a row.

All the axial grooves 5 of each middle land portion 4B are inclined toward one side in the tire circumferential direction toward the axially outside from the axially inside of the tire. Further, all the shoulder lateral grooves of each shoulder land portion 4A are inclined toward the above-said one side in the tire circumferential direction toward the axially outside from the axially inside of the tire.

In the embodiment, therefore, the tread pattern is a unidirectional pattern.

It is preferable that the land portion 4 (the middle land portions 4B in this example) provided with the axial grooves 5 and the sipes 6 is made of a rubber compound whose complex elastic modulus E* is greater than that of other land portion not provided with the axial grooves 5 and the sipes 6 in order to secure high rigidity.

Thus, in this embodiment, the complex elastic modulus E*1 of the middle land portions 4B is higher than the complex elastic modulus E*2 of the shoulder land portions 4A and the crown land portion 4C. Preferably, the ratio (E*1/E*2) is set in a range from 1.5 to 3.0 in order to improve the rigidity and the demolding in a well-balanced manner.

such as chipping and cracking, and the number of the damages was counted. The counting was made for ten samples per each test tire to obtain their average. The results are shown in Table 1, wherein the smaller numerical value is better.

<Drainage Performance Test>

Using an inner drum type test machine, each test tire was measured to obtain the speed at which the braking force was reduced down to 50% of the maximum braking force by the occurrence of hydroplaning phenomenon under the following conditions: tire pressure: 230 kPa, tire load: 4.2 kN, depth of water on the inner circumferential surface: 5.0 mm, slip angle: 1.0 degree. The results are indicated in Table 1 by an index based on Reference tire REF being 100, wherein the larger the numerical value, the better the drainage performance.

<Cornering Power Test>

Using an outer drum type test machine, each test tire was measured for cornering force under the following conditions, and the cornering power was obtained: tire pressure: 230 kPa, tire load: 4.2 kN, slip angle: 1.0 degree.

The results are indicated in Table 1 by an index based on Reference tire REF being 100, wherein the larger the numerical value, the higher the cornering power and the higher the tread pattern rigidity.

TABLE 1

| Tire | REF | EX1 | EX2 | EX3 | EX4 | EX5 | EX6 | EX7 | EX8 |
|---|---|---|---|---|---|---|---|---|---|
| Sipe 6 | none | | | | | | | | |
| L1/w2 | — | 1.1 | 1.0 | 1.5 | 1.6 | 1.1 | 1.1 | 1.1 | 1.1 |
| h3/h1(%) | — | 165 | 165 | 165 | 165 | 100 | 200 | 165 | 165 |
| Max. w2/w1 | 5 | 5 | 5 | 5 | 5 | 5 | 5 | 3 | 8 |
| Demolding | 10 | 1 | 3 | 1 | 1 | 2 | 1 | 1 | 2 |
| Drainage | 100 | 102 | 102 | 102 | 102 | 102 | 102 | 102 | 102 |
| Cornering power | 100 | 100 | 100 | 98 | 95 | 100 | 95 | 95 | 100 |

Figure 5:
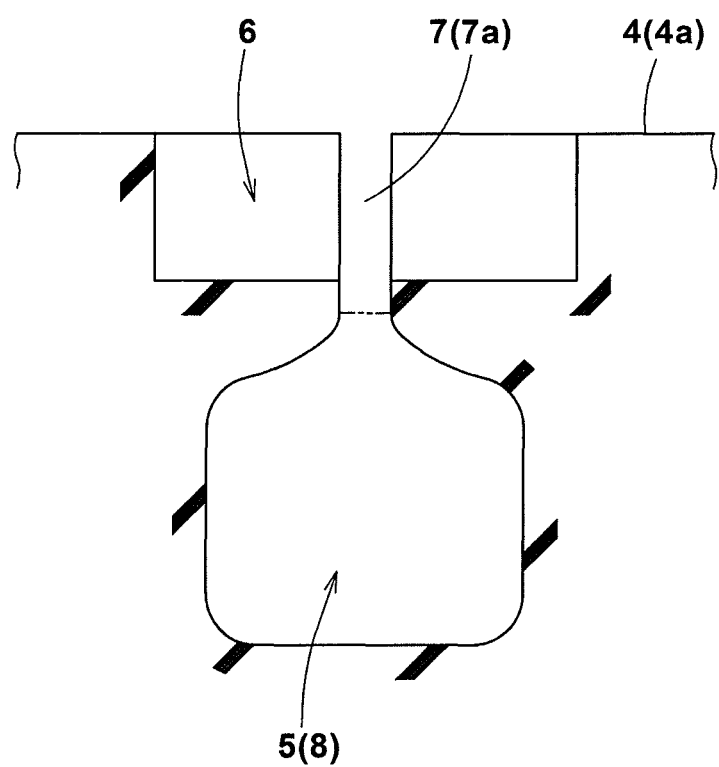
FIG. 5 is a cross-sectional view of an axial groove and a sipe of another embodiment.

FIG. 5 shows a modification of the example of the combination of the axial groove 5 and the sipes 6 shown in FIG. 2. In this example, each sipe 6 extends radially inwardly from the tread surface 4a of the land portion 4 and terminates within the radial extent of the equi-width part 7a of the radially outer portion 7, without reaching the radially inner portion 8 in order to lessen the decrease in the rigidity of the land portion 4. This example is otherwise the same as the former example.

Comparison Tests

Based on the tread pattern shown in FIG. 1, pneumatic tires of size 225/45R17 for passenger cars were experimentally manufactured as test tires (EX1-EX8 and REF), and tested for the demolding difficulty, drainage performance and cornering power. In the test tires EX1-EX4, EX7 and EX8, the sipes 6 extended radially inwardly to the boundary between the widening part 8a and the constant-width part 8b of the radially inner portion 8. In the test tire EX5, the sipes 6 extended to the radially inner end of the equi-width part 7a. In the tire EX6, the sipes extended to the constant-width part 8b.

The specifications are shown in Table 1.

Common specifications are as follows.
    Depth H of axial groove 5: 6.3 mm
    Depth h1 of radially outer portion 7: 3 mm (48% H)
    Maximum of width w2 of radially inner portion 8: 4 mm
    width w3 of Sipe 6: 0.7 mm <Demolding Test>

After each test tire was demolded, the axial grooves 5 crossed by the sipes 6 were visually inspected for damages From the test results, it was confirmed that, according to the present invention, the damages caused by demolding can be effectively suppressed, without sacrificing the drainage and cornering power.

while detailed description has been made of preferable embodiments of the present invention, the present invention can be embodied in various forms without being limited to the illustrated embodiments.

DESCRIPTION OF THE REFERENCE SIGNS 1 tire
2 tread portion
3 main groove
4 land portion
4a tread surface
5 axial groove
6 sipe
7 radially outer portion
8 radially inner portion

The invention claimed is:

1. A tire comprising:
a tread portion provided with at least one main groove extending continuously in the tire circumferential direction to axially divide the tread portion into land portions having axial widths, wherein
the land portions includes a first land portion provided with axial grooves extending in a tire axial direction across the entire axial width of the first land portion so that both ends of each axial groove are opened on both sides in the tire axial direction of the first land portion, and each of the axial grooves comprises a radially outer portion and a radially inner portion which is wider than the radially outer portion, wherein at least the radially outer portion of each of the axial grooves is crossed by a sipe extending from one side to the other side of the axial groove, wherein the radially outer portion is defined as having a constant width along the radial direction thereof, the radially inner portion comprises a widening part extending radially inwardly from the radially outer portion while gradually increasing the groove width, and a constant-width part extending radially inwardly from the widening part while keeping the groove width constant defining a maximum groove width, wherein said sipe extends from a radially outer surface of the first land portion to the constant-width part of the radially inner portion and terminates without reaching a bottom of the axial groove, wherein said each of the axial grooves is curved in an arc shape in its top view, and crossed by said sipe at substantially a right angle, and said sipe has a length more than 1.0 times and not more than 1.5 times said maximum groove width of the constant-width part of the radially inner portion, wherein the land portions include
a pair of axially outermost shoulder land portions, and said first land portion provided as a pair of middle land portions disposed between the shoulder land portions, and
each of the middle land portions is provided with neither grooves nor sipes other than said each of the axial grooves and said sipes.

2. The tire according to claim 1, wherein
the axial grooves are inclined with respect to the tire axial direction.

3. The tire according to claim 2, wherein
the axial grooves are inclined at 25 to 70 degrees with respect to the tire axial direction.

4. The tire according to claim 1, wherein
each of the axial grooves is crossed by a plurality of said sipes.

5. The tire according to claim 4, wherein each of the axial grooves is crossed by two of said sipes.

6. The tire according to claim 1, wherein
the middle land portions are made of a rubber compound having a complex elastic modulus greater than that of the shoulder land portions.

7. The tire according to claim 6, wherein
each of the axial grooves is inclined at 25 to 70 degrees with respect to the tire axial direction,
each of the axial grooves is crossed by a plurality of said sipes, and
the axial grooves in one of the middle land portions are inclined to one direction with respect to the tire axial direction, whereas the axial grooves in the other of the middle land portions are inclined oppositely to said one direction with respect to the tire axial direction.

8. The tire according to claim 1, wherein
each of the axial grooves is inclined at 25 to 70 degrees with respect to the tire axial direction, and
each of the axial grooves is crossed by a plurality of said sipes.

9. The tire according to claim 8, wherein each of the axial grooves is crossed by two of said sipes.

10. A tire comprising:
a tread portion provided with at least one main groove extending continuously in the tire circumferential direction to axially divide the tread portion into land portions having axial widths,
wherein
the land portions include a first land portion provided with axial grooves extending in a tire axial direction and each comprising a radially outer portion and a radially inner portion which is wider than the radially outer portion,
at least the radially outer portion of each of the axial grooves is crossed by a sipe extending from one side to the other side of the axial groove,
the axial grooves extend across the entire axial width of the first land portion so that both ends of each axial groove are opened on both sides in the tire axial direction of the first land portion,
said sipe and the axial grooves have different depths measured from a radially outer surface of the first land portion,
wherein the radially inner portion is a constant-width part extending radially inwardly while keeping the groove width constant defining a maximum groove width,
wherein said each of the axial grooves is curved in an arc shape in its top view and crossed by said sipe at substantially a right angle, and
said sipe has a length more than 1.0 times and not more than 1.5 times said maximum groove width of the constant-width part of the radially inner portion,
wherein the first land portion is provided with neither grooves nor sipes other than said each of the axial grooves and said sipes.

11. The tire according to claim 10, wherein
said sipe extends radially inwardly from a radially outer surface of the first land portion to the constant-width part and terminates without reaching the radially inner portion.

12. The tire according to claim 10, wherein
the axial grooves are inclined at 25 to 70 degrees with respect to the tire axial direction, and
each of the axial grooves is crossed by a plurality of said sipes.

13. The tire according to claim 10, wherein
the land portions include a pair of axially outermost shoulder land portions, a crown land portion, and said first land portion provided as a pair of middle land portions each disposed between the crown land portion and one of the shoulder land portions, and
the axial grooves of one of the middle land portions are inclined to one direction with respect to the tire axial direction, whereas the axial grooves of the other of the middle land portions are inclined oppositely to said one direction with respect to the tire axial direction.

14. The tire according to claim 13, wherein the crown land portion is not provided with grooves or sipes.

15. The tire according to claim 14, wherein each of the shoulder land portions is provided with shoulder lateral grooves to divide the shoulder land portion into blocks in a row.

16. The tire according to claim 13, wherein said at least one main groove is four straight main grooves.

17. The tire according to claim 16, wherein the crown land portion is not provided with grooves or sipes.

18. The tire according to claim 17, wherein each of the shoulder land portions is provided with shoulder lateral grooves to divide the shoulder land portion into blocks in a row.

\* \* \* \* \*